(12) United States Patent
Shinozaki et al.

(10) Patent No.: US 8,940,452 B2
(45) Date of Patent: Jan. 27, 2015

(54) ELECTRODE CATALYST SUBSTRATE AND METHOD FOR PRODUCING THE SAME, AND POLYMER ELECTROLYTE FUEL CELL

(75) Inventors: Kazuma Shinozaki, Aichi (JP); Atsuhito Okamoto, Aichi (JP); Tatsuya Hatanaka, Aichi (JP); Hiroaki Takahashi, Toyota (JP); Tomoaki Terada, Kakegawa (JP); Takahiro Nagata, Kakegawa (JP)

(73) Assignees: Toyota Jidosha Kabushiki Kaisha, Toyota-shi, Aichi (JP); Cataler Corporation, Kakegawa-shi, Shizuoka (JP)

( * ) Notice: Subject to any disclaimer, the term of this patent is extended or adjusted under 35 U.S.C. 154(b) by 429 days.

(21) Appl. No.: 12/666,003

(22) PCT Filed: Jun. 25, 2008

(86) PCT No.: PCT/JP2008/061937
§ 371 (c)(1),
(2), (4) Date: Dec. 22, 2009

(87) PCT Pub. No.: WO2009/001964
PCT Pub. Date: Dec. 31, 2008

(65) Prior Publication Data
US 2010/0330451 A1     Dec. 30, 2010

(30) Foreign Application Priority Data

Jun. 28, 2007   (JP) .................. 2007-169983

(51) Int. Cl.
*H01M 8/10* (2006.01)
*H01M 4/02* (2006.01)
(Continued)

(52) U.S. Cl.
CPC .......... *H01M 4/8605* (2013.01); *H01M 4/8807* (2013.01); *H01M 4/8817* (2013.01);
(Continued)

(58) Field of Classification Search
USPC ........................ 429/482, 532; 427/115, 553
See application file for complete search history.

(56) References Cited

U.S. PATENT DOCUMENTS

| 2002/0106552 A1 | 8/2002 | Yamaura et al. |
| 2004/0067847 A1 | 4/2004 | Kato |

(Continued)

FOREIGN PATENT DOCUMENTS

| EP | 1 710 014 A1 | 10/2006 |
| JP | 63-144153 | 6/1988 |

(Continued)

OTHER PUBLICATIONS

Sun, X. et al., "Composite electrodes made of Pt nanoparticles deposited on carbon nanotubes grown on fuel cell backings," Chemical Physics Letters, 379, (2003), pp. 99-104.*

(Continued)

*Primary Examiner* — Karie O'Neill Apicella
(74) *Attorney, Agent, or Firm* — Finnegan, Henderson, Farabow, Garrett & Dunner, LLP (57) ABSTRACT

A method for producing an electrode catalyst substrate is provided herein, which comprises a carbon film forming step of forming a porous carbon film on a base, a hydrophilization step of hydrophilizing the porous carbon film, an immersion step of immersing the base in a solution prepared by dissolving catalytic metal ions in a polar solvent, and a reduction step of adding a reducing agent to the solution and thus reducing the catalytic metal ions. An electrode catalyst substrate obtained by the method and a polymer electrolyte fuel cell in which the electrode catalyst obtained by the method is used for anodes and/or cathodes are also provided herein. In the electrode catalyst of the present invention, fine catalyst particles are loaded in a uniform and highly dispersed manner.

6 Claims, 3 Drawing Sheets

(51) Int. Cl.
  *B05D 3/00* (2006.01)
  *H01M 4/86* (2006.01)
  *H01M 4/88* (2006.01)
  *H01M 4/90* (2006.01)
  *H01M 4/92* (2006.01)

(52) U.S. Cl.
  CPC ............ *H01M4/8842* (2013.01); *H01M 4/885* (2013.01); *H01M 4/9083* (2013.01); *H01M 4/926* (2013.01); *H01M 2008/1095* (2013.01); *Y02E 60/50* (2013.01)
  USPC ............ 429/482; 429/532; 427/115; 427/553

(56) References Cited

U.S. PATENT DOCUMENTS

| | | | | |
|---|---|---|---|---|
| 2006/0229194 | A1* | 10/2006 | Uchida et al. | 502/101 |
| 2007/0166603 | A1 | 7/2007 | Nakanishi et al. | |

FOREIGN PATENT DOCUMENTS

| | | |
|---|---|---|
| JP | 2003-7308 | 1/2003 |
| JP | 2003-246613 | 9/2003 |
| JP | 2003-261311 | 9/2003 |
| JP | 2003-300715 | 10/2003 |
| JP | 2003-300716 | 10/2003 |
| JP | 2004-26532 | 1/2004 |
| JP | 2004-127814 | 4/2004 |
| JP | 2005-166344 | 6/2005 |
| JP | 2005-166409 | 6/2005 |
| JP | 2005-203332 | 7/2005 |
| JP | 2005-213700 | 8/2005 |
| JP | 2005-285511 | 10/2005 |
| JP | 2005-302305 | 10/2005 |
| JP | 2005-353493 | 12/2005 |
| JP | 2005-353496 | 12/2005 |
| JP | 2006-66138 | 3/2006 |
| JP | 2006-66139 | 3/2006 |
| JP | 2006-216469 | 8/2006 |
| JP | 2006-216470 | 8/2006 |
| JP | 2006-234788 | 9/2006 |
| WO | WO 02/27843 A1 | 4/2002 |
| WO | WO 2004/000728 A1 | 12/2003 |
| WO | WO 2004000728 A1 * | 12/2003 |
| WO | WO 2006/009324 A1 | 1/2006 |
| WO | WO 2006/080702 A1 | 8/2006 |
| WO | WO 2006080702 A1 * | 8/2006 |
| WO | WO 2006/099593 A2 | 9/2006 |

OTHER PUBLICATIONS

Cao, L. et al., "Novel Nanocomposite Pt/RuO2.xH2O/Carbon Nanotube Catalysts for Direct Methanol Fuel Cells," Angewandte Chemie Int. Ed., 2006, 45, pp. 5315-5319.*
European Search Report for EP Appl. No. 08765862.1 dated Mar. 19, 2012.
Cao, L. et al., "Novel Nanocomposite Pt/RuO$_2$·xH$_2$O/Carbon Nanotube Catalysts for Direct Methanol Fuel Cells," Angewandte Chemie Int. Ed., 2006, 45, pp. 5315-5319.
Waje, M. et al., "Deposition of platinum nanoparticles on organic functionalized carbon nanotubes grown in situ on carbon paper for fuel cells," Nanotechnology, 16, (2005), pp. S5395-S400.
Li., Wenzhen et al., "Pt-Ru Supported on Double-Walled Carbon Nanotubes as High-Performance Anode Catalysts for Direct Methanol Fuel Cells," J. Phys. Chem. B, 2006, 110, pp. 15353-15358.

* cited by examiner

ELECTRODE CATALYST SUBSTRATE AND METHOD FOR PRODUCING THE SAME, AND POLYMER ELECTROLYTE FUEL CELL

CROSS-REFERENCE TO RELATED APPLICATIONS

This application is a national phase application of International Application No. PCT/JP2008/061937, filed Jun. 25, 2008, and claims the priority of Japanese Application No. 2007-169983, filed Jun. 28, 2007, the contents of both of which are incorporated herein by reference.

TECHNICAL FIELD

The present invention relates to an electrode catalyst substrate and a method for producing the same, and a polymer electrolyte fuel cell. The present invention further specifically relates to an electrode catalyst substrate on which an electrode catalyst that is used for anodes and/or cathodes of various electrochemical devices (e.g., fuel cells, solar cells, lithium cells, water electrolytic devices, electrolytic devices for halogen acid, electrolytic devices for common salt, oxygen and/or hydrogen thickners, humidity sensors, gas sensors, and photocatalysts) is immobilized and a method for producing such substrate, and a polymer electrolyte fuel cell using such electrode catalyst.

BACKGROUND ART

In various electrochemical devices such as polymer electrolyte fuel cells or water electrolytic devices, a solid polymer electrolyte is shaped into a membrane, to both sides of which electrodes are each bonded, and is then used in the form of a membrane electrode assembly (MEA). Also, in a polymer electrolyte fuel cell, an electrode generally has a double-layered structure with a diffusion layer and a catalyst layer. The diffusion layer serves to supply reaction gas and electrons to the catalyst layer, for which carbon fiber, carbon paper, or the like is used. Furthermore, the catalyst layer provides a reaction field for an electrode reaction, which generally comprises a complex of an electrode catalyst and a solid polymer electrolyte.

For such electrode catalyst to be used for various electrochemical devices, fine particles (e.g., Pt black) of a noble metal such as Pt, carbonaceous (e.g. carbon black) carriers onto which fine particles of a noble metal such as Pt are loaded, and noble metal thin films formed on electrolyte membrane surfaces by a method such as metal plating or sputtering have been conventionally used, for example.

However, noble metals such as Pt show high catalytic activity and stability in high catalytic activity, but are expensive and limited as resources. Hence, this is a reason such that the electrode catalyst increases the cost of various electrochemical devices. In particular, fuel cells are used in a form in which many MEAs are stacked, so as to obtain predetermined output. Thus, the amount of an electrode catalyst to be used per fuel cell is high. This inhibits the spread of such fuel cells.

Various proposals have been made to address the problem.

For example, JP Patent Publication (Kokai) No. 2005-285511 A discloses a method for producing a fuel cell, comprising:
(1) adding Pt-loaded carbon black powder (Pt/C) to a hydrogen peroxide solution;
(2) further adding an electrolyte polymer to the solution when oxygen generation ceases, agitating the solution for 30 minutes, and then allowing the solution to stand so as to precipitate Pt/C particles;
(3) decanting the supernatant solution and then collecting electrolyte polymer-coated Pt/C;
(4) preparing a paste for electrodes using the thus obtained electrolyte polymer-coated Pt/C, coating a diffusion layer with the paste for electrodes, and then bonding the coated layer to the electrolyte membrane.

JP Patent Publication (Kokai) No. 2005-285511 A describes the following: that since a hydrophilic group is introduced onto the C surface through treatment of Pt/C with a hydrogen peroxide solution, the Pt/C surface can be uniformly coated with an electrolyte polymer; and that since Pt/C is uniformly dispersed within an electrode paste when the paste for electrodes is prepared using the electrolyte polymer-coated Pt/C, a high-performance catalyst layer can be obtained.

Also, JP Patent Publication (Kokai) No. 2006-066138 A does not disclose, an electrode catalyst, but rather a method for producing a separator for fuel cells, comprising forming fine convexoconcaves on the surface of a separator for fuel cells comprising a mixture of graphite particles and binder resin and then hydrophilizing the separator surface using an RF plasma device. This patent document also describes that through the formation of fine convexoconcaves on the separator surface and hydrophilization, the hydrophilicity of the separator and the flooding resistance of the fuel cell are improved.

Moreover, JP Patent Publication (Kokai) No. 63-144153 (1988) A does not describe an electrode catalyst, but rather the fact that carbon fibers can be hydrophilized by carrying out low-temperature plasma treatment for hydrophilization gases containing oxygen, argon, carbon dioxide, ammonia, and nitrogen.

DISCLOSURE OF THE INVENTION

To reduce the amount used of an expensive noble metal catalyst while maintaining a high fuel cell output, fine catalyst particles should be uniformly dispersed within a catalyst layer. A method that involves loading noble metal particles onto the surface of a powdered porous carrier such as carbon black is effective as a method for uniform and fine dispersion of catalyst particles. However, when noble metal particles are loaded onto a powdered porous carrier, the noble metal particles are not always loaded onto the carrier surface, but may be loaded inside the porous carrier away from the surface. Noble metal particles loaded within the porous carrier hardly contribute to electrode reactions. Therefore, improvement in the dispersibility of a noble metal particle-loaded carrier alone can cause a limited improvement in utilization rate of catalyst particles.

An object to be achieved by the present invention is to provide an electrode catalyst substrate on which an electrode catalyst is immobilized (and onto the electrode catalyst, fine catalyst particles are loaded in a uniform and highly dispersed manner) and a method for producing the electrode catalyst substrate, and a polymer electrolyte fuel cell using such electrode catalyst.

Also, another object to be achieved by the present invention is to provide an electrode catalyst substrate on which an electrode catalyst with a high utilization rate of catalyst particles is immobilized and a method for producing the same, and a polymer electrolyte fuel cell using such electrode catalyst.

To achieve the above objects, the electrode catalyst substrate according to the present invention is characterized in that it comprises a base and an electrode catalyst immobilized on the surface of the base, wherein the electrode catalyst comprises a porous carbon film immobilized on the surface of the base and a catalyst metal loaded onto the surface of the porous carbon film;

the mean particle diameter of the catalyst particles is 1.5±1 nm; and the loading density of the catalyst particles is $2.0 \times 10^{16}$ particles/m$^2$ or greater.

Furthermore, the polymer electrolyte fuel cell according to the present invention is characterized in that the electrode catalyst according to the present invention is used for anodes and/or cathodes.

Furthermore, the method for producing an electrode catalyst substrate according to the present invention is characterized in that it comprises:

a carbon film forming step of forming a porous carbon film on a base;

a hydrophilization step of hydrophilizing the porous carbon film;

an immersion step of immersing the base in a solution prepared by dissolving catalytic metal ions in a polar solvent; and a reduction step of adding a reducing agent to the solution and then reducing the catalytic metal ions.

A porous carbon film is hydrophilized and then the hydrophilized film is immersed in a solution containing catalytic metal ions, so that the porous carbon film can be entirely impregnated with the solution. After this, a reducing agent is added to the solution and then catalytic metal ions are reduced, so that catalyst particles can be loaded onto the surface of the porous carbon film in a fine and highly dispersed manner. This may be because hydrophilic groups introduced onto the surface of the porous carbon film function as nuclei for the precipitation of catalyst particles. In the thus obtained electrode catalyst, catalyst particles are loaded in a highly dispersed manner along the gas diffusion pathway. Hence, the output of the fuel cell can be improved using the electrode catalyst for anodes and/or cathodes of fuel cells.

BEST MODE FOR CARRYING OUT THE INVENTION

An embodiment of the present invention will be described in detail as follows. The electrode catalyst substrate according to the present invention comprises a base, a porous carbon film, and catalyst particles.

[1. Base]

The base is used for supporting a porous carbon film. A porous carbon film, onto which catalyst particles are loaded, is transferred onto the surface of an electrolyte membrane, as described later. Therefore, the material of the base is not particularly limited, as long as a porous carbon film can be formed on the surface of the base and the transfer of the film is easy.

Specific examples of the base include Si, thermally oxidized membrane-attached Si, sapphire, magnesia, various metals, oxide, a nitride-deposited. Si substrate, and a mesoporous material. Particularly, a mesoporous material is appropriate as a base for the formation of a vertically aligned carbon nanotube (CNT)

[2. Porous Carbon Film]

The porous carbon film is immobilized on the surface of a base. The porous carbon film may be any porous carbon film as long as it makes it possible to diffuse reaction gas into an electrolyte membrane/catalyst layer boundary with low loss and enables the loading of a required amount of catalyst particles.

Specific examples of the porous carbon film include:
(1) a porous film of CNTs vertically aligned on a base;
(2) a carbon deposited film; and
(3) a resin carbonized film.

Particularly, in a porous vertically aligned CNT film. CNTs are aligned almost in parallel to the gas diffusion pathway. Since improvement in gas diffusion can be expected because of such a vertical alignment structure, the film is appropriate as a carrier for catalyst particles.

The thickness and the specific surface area of the porous carbon film can be arbitrarily selected depending on purpose. In general, the thinner the porous carbon film, the lower the gas diffusion resistance. Hence, high output cat be obtained. Meanwhile, if porous carbon film is too thin, the absolute amount of catalyst particles to be loaded is decreased and the output is lowered. Therefore, the thickness of the porous carbon film preferably ranges from 10 μm to 100 μm.

Furthermore, generally the larger the specific surface area of the porous carbon film, the higher the amount of catalyst particles to be loaded per unit area. Thus, high output can be obtained.

[3. Catalyst Particle]

Catalyst particles must be loaded onto the surface of a porous carbon film in a fine and highly dispersed manner. If the particle diameter of catalyst particles is too small, the catalytic activity is even further lowered. On the other hand, if the particle diameter of catalyst particles is too large, the utilization rate of the catalyst is decreased. To increase the utilization rate of the catalyst and to obtain high output, the mean particle diameter of catalyst particles is preferably 1.5±1 nm.

Also, if the loading density of catalyst particles is too low, high output cannot be obtained. To obtain high output, the loading density of catalyst particles is preferably $2.0 \times 10^{16}$ particles/m$^2$ or more. The loading density of catalyst particles is further preferably $2.5 \times 10^{16}$ particles/m$^2$ or more. Such catalyst particles loaded in a fine and highly dispersed manner can be produced by the methods as described below.

In addition, the mean particle diameter of catalyst particles can be found by measuring the diameters of 200 or more catalyst particles randomly selected from TEM photographs and then calculating the mean value thereof.

When a porous carbon film is a porous CNT film, the loading density of catalyst particles can be found by measuring the diameters and lengths of CNTs from TEM photographs and the number of catalyst particles loaded onto a single CNT, and then calculating the number of catalyst particles per unit area of CNT.

When a porous carbon film is a film other than porous CNT films, the loading density of catalyst particles can be found using the formula $L/((4/3 * \pi r^3)*d/(S*M)$(particles/m$^2$) wherein S (m$^2$/g) is the specific surface area of the porous carbon film found by N$_2$ adsorption measurement based on the BET method, M (g/m$^2$geo) is the weight of the porous carbon film deposited on a substrate, 2r (mPt) is the mean particle diameter of 200 or more catalyst particles (found using TEM photographs in a manner similar to that for CNT), L (gPt/m²geo) is the amount of Pt loaded onto the porous carbon film found from a change in weight before and after loading, and d (gPt/mPt³) is Pt density.

In the present invention, the composition of a catalyst particle is not particularly limited. All materials that contribute to an electrode reaction can be used as catalysts. Specific examples of such a catalyst include:

(1) a noble metal such as platinum, palladium, rhodium, ruthenium, iridium, gold, and silver, or an alloy containing two or more thereof; and (2) an alloy of 1 type or 2 or more types of noble metal and 1 type or 2 or more types of transition metal element, such as cobalt, nickel, iron, and chromium.

Next, the method for producing an electrode catalyst substrate according to the present invention is described as follows.

The method for producing an electrode catalyst substrate according to the present invention comprises the steps of carbon film formation, hydrophilization, immersion, and reduction.

[1. Carbon Film Forming Step]

The carbon film forming step is a step of forming a porous carbon film on a base. For example, a porous film of vertically aligned CNTs can be produced by a method described below.

Specifically, first, a catalyst for CNT synthesis is loaded onto the surface of a base.

Examples of a catalyst for CNT synthesis include:
(1) Fe, Co, Ni, or an alloy thereof; and
(2) an alloy containing Fe, Co and/or Ni and 1 or more elements selected from among Group 4A elements (Ti, Zr, and Hf) and Group 5A elements (V, Nb, and Ta).

A catalyst for CNT synthesis can be obtained by dissolving an organic complex containing the above described elements (e.g., acetylacetonate, trifluoroacetylacetonate, and diisopropoxide bis tetramethyl heptanedionate) or an organic inorganic acid salt (e.g., acetate, oxalate, and sulfate) in an organic solvent, adding alcohol as a reducing agent and organic acid or organic amine as a protection layer to the solution, and then heating the solution at a predetermined temperature. The temperature for heating preferably ranges from 300° C. to 500° C. The thus obtained catalyst for CNT synthesis is dispersed in an appropriate solvent, the surface of a base is coated with the resultant, and then the solvent is volatilized, so that the catalyst for CNT synthesis can be loaded onto the surface of a base. At this time, when a mesoporous material is used as a base, the catalyst for CNT synthesis can be loaded onto the surface of the base in a highly dispersed manner.

Next, a base onto which the catalyst for CNT synthesis is loaded is placed within a reactor and then the pressure is reduced to a predetermined pressure level (e.g., $10^{-5}$ Torr ($1.3 \times 10^{-3}$ Pa) or less). Subsequently, the temperature of the base is increased to a temperature for synthesis using a heater. The temperature for synthesis preferably ranges from 500° C. to 900° C. When the temperature of the base reaches the temperature for synthesis, a carrier gas and a carbon-containing compound gas (e.g., a hydrocarbon gas such as methane, ethane, and propane) are supplied at a predetermined flow rate for several minutes to several hours using a reaction gas supplier while adjusting the pressure. Thus, CNT can be grown vertically with respect to the base surface.

Examples of a method for forming a porous carbon film other than the porous vertically aligned CNT film on the surface of a substrate include:

(1) a method that involves depositing carbon on the surface of a substrate using a carbon deposition apparatus; and (2) a method that involves coating the surface of a substrate with phenol resin, and then thermally decomposing the phenol resin.

[2. Hydrophilization Step]

Hydrophilization step is a step of hydrophilizing a porous carbon film immobilized on the surface of a base. Any hydrophilization method may be employed herein, as long as the surface of a porous carbon film (including inner surfaces of open pores) can be uniformly hydrophilized by the method.

Specific examples of such hydrophilization method include UV ozonation, water plasma treatment, and oxygen plasma treatment.

In particular, UV ozonation is convenient, by which hydrophilization can be carried out without being affected by the repellency of the porous carbon film. Hence, UV ozonation is preferable as a hydrophilization method.

[3. Immersion Step]

The immersion step is a step of immersing a base in a solution prepared by dissolving catalytic metal ions in a polar solvent, by which the solution penetrates the pores of the porous carbon film.

As a polar solvent in which catalytic metal ions are dissolved, water, ethanol, methanol, 1-propanol, 2-propanol, butanol, ethylene glycol, propylene glycol, or the like can be used. In particular, water is particularly preferable as a solvent since there is no fear that water would cause catalyst metal poisoning.

Any noble metal source and any transition metal source may be employed herein, as long as they are soluble in the above-mentioned polar solvents.

Specific examples of such noble metal sources are as follows. They can be used independently or in combinations of 2 or more types thereof.

(1) Pt compounds such as hexachloroplatinic acid (IV) hexahydrate, dinitrodiammine platinum (II), hexaamine platinum (IV) chloride, tetraammine platinum (II) chloride, and bis(acetylacetonato)platinum (II).

(2) Pd compounds such as palladium sulfate, palladium chloride, palladium nitrate, dinitrodiammine palladium(II), bis (acetylacetonato)palladium (II), and trans-dichlorobis(triphenylphosphine)palladium (II).

(3) Rh compounds such as rhodium chloride, rhodium sulfate, rhodium nitrate, rhodium(II)acetate, tris(acetylacetonato)rhodium (III), chlorotris(triphenylphosphine)rhodium (I), acetylacetonatodicarbonylrhodium (I), and tetracarbonyldi-μ-chlorodirhodium (I).

(4) Ru compounds such as ruthenium chloride, ruthenium nitrate, dodecacarbonyl triruthenium (0), and tris(acetylacetonato)ruthenium (III).

(5) Ir compounds such as hexachloroiridium (TV) acid hexahydrate, dodecacarbonyltetrairidium (0), carbonylchlorobis(triphenylphosphine)iridium (I), and tris(acetylacetonato)iridium (III).

(6) Au compounds such as hexachlorogold (IV) acid hexahydrate and ammonium gold cyanide.

(7) Ag compounds such as silver nitrate and silver cyanide.

Also, specific examples of a transition metal source are as listed below. They can be used independently or in combination of 2 or more types thereof.

(1) Nitrate such as $Co(NO_3)_2$, $Ni(NO_3)_2$, $Fe(NO_3)_2$, and $Cr(NO_3)_2$.

(2) Hydroxide such as $Co(OH)_2$.

(3) Sulfate such as $CoSO_4$, $NiSO_4$, $FeSO_4$, and $CrSO_4$.

(4) Chloride such as $CoCl_2$, $NiCl_2$, $FeCl_2$, and $CrCl_2$.

Particularly, nitrates and sulfates have high solubility to polar solvents, so that they are oxidized with difficulty even under conditions other than anaerobic conditions. Moreover, nitrates and sulfates contain no ions that cause catalyst poisoning, so that they are particularly preferable as transition metal sources.

In general, an excessively low concentration of a noble metal source and a transition metal source in a solution results in an inefficient precipitation reaction of catalyst particles. On the other hand, an excessively high concentration of a noble metal source and a transition metal source makes uniform and fine precipitation of catalyst particles difficult. Therefore, an optimum concentration of a noble metal source and a transition metal source to be dissolved in a solvent is preferably selected depending on the types of the noble metal source and the transition metal source, the compositions of catalyst particles, and the like. The concentration of a noble metal source and a transition metal source preferably ranges from $10^{-4}$ wt % to 1.0 wt %, further preferably ranges from $10^{-4}$ wt % to $5 \times 10^{-2}$ wt %, and furthermore preferably ranges from $10^{-4}$ wt % to $10^{-2}$ wt %.

In addition, any volume of a solution may be employed, as long as it is sufficient for immersion of a base.

[4. Reduction Step]

The reduction step is a step of reducing catalytic metal ions by immersing a substrate in a solution containing the catalytic metal ions and then adding a reducing agent to the solution.

A reducing agent serves to reduce catalytic metal ions in a solution so as to be precipitated as metal particles. Specific examples of the reducing agent include ethanol, methanol, formic acid, sodium borohydride ($NaBH_4$), hydrazine, ethylene glycol, and propylene glycol. They can be used independently or in combination of 2 or more types thereof.

When a reducing agent has relatively strong reduction power, a reduction reaction proceeds only by adding the reducing agent to a solution. However, excessively strong reduction power of a reducing agent increases the probability of precipitation of catalyst particles in the solution rather than on the surface of a porous carbon film. Hence, a reducing agent with such excessively high reduction power is not preferred herein.

Meanwhile, when a reducing agent having relatively weak reduction power is used, the addition alone of the reducing agent to a solution results in almost no progress of a reduction reaction. Accordingly, in such case, it is preferable to increase the reaction rate of the reduction reaction by increasing the temperature of the solution.

In either a ease of using a reducing agent with relatively strong reduction power or a case of using a reducing agent with relatively weak reduction power, it is preferable to carry out a reduction reaction while convecting catalytic metal ions in the coexistence of the reducing agent. When a reduction reaction is carried out while performing convection, a noble metal source and a transition metal source are forcedly supplied to the porous carbon film. Thus, catalyst particles can be efficiently loaded onto the surface of the porous carbon film.

In particular when the temperature is increased while convecting a solution containing catalytic metal ions in the coexistence of a reducing agent having relatively weak reduction power, catalyst particles can be uniformly and finely loaded onto the surface of the porous carbon film. Examples of a reducing agent appropriate for such method include ethanol, methanol, ethylene glycol, and propylene glycol.

The optimum temperature, reaction time, amount of reducing agent to be used, and the like upon reduction reaction are selected depending on the types of noble metal source, transition metal source, and reducing agent, the concentration of a noble metal source and a transition metal source, and the like in a solution. In general, a reduction reaction is preferably carried out under mild conditions, so that catalyst particles can be uniformly and finely loaded onto the surface of a porous carbon film.

Also, optimization of the amount of a reducing agent to be used and of the time period over which it is used makes it possible to control the reduction reaction rate. Generally, the relatively lower the amount of a reducing agent to be used, the slower the progression of a reduction reaction. Hence, the catalyst particle diameter can be decreased. On the other hand, when a reduction reaction proceeds to some extent and the concentration of the catalytic metal ions remaining in the solution is decreased, the reduction reaction rate will be much slower. Therefore, a relatively small amount of a reducing agent (specifically, 1% to 20% of the total amount of the reducing agent to be used) is added at the beginning of the reaction, so as to accelerate the nucleation of catalyst particles. Then a relatively large amount of the reducing agent is added late in the reaction, so that catalyst particles with small particle diameters can be efficiently produced.

Next, the polymer electrolyte fuel cell according to the present invention is as described below.

A polymer electrolyte fuel cell comprises a membrane electrode assembly (MEA) in which electrodes are bonded on both sides of a solid polymer electrolyte membrane. Also, a polymer electrolyte fuel cell generally comprises a plurality of stacked MEAs, when the both sides of MEA are sandwiched by separators provided with gas channels.

In the present invention, the material of a solid polymer electrolyte membrane is not particularly limited and various materials can be used herein.

Specifically, the material of a solid polymer electrolyte membrane may be either a hydrocarbon-based electrolyte containing a C—H bond, but containing no C—F bond within a polymer chain or a fluorine-based electrolyte containing a C—F bond within a polymer chain. Also, a fluorine-based electrolyte may be either a partial fluorine-based electrolyte containing both C—H bond and C—F bond within a polymer chain, or a wholly fluorinated electrolyte containing a C—F bond, but containing no C—H bond within a polymer chain.

In addition, a fluorine-based electrolyte may also comprise, in addition to a fluorocarbon structure (—$CF_2$— or —CFCl—), a chlorocarbon structure (—$CCl_2$—) or other structures (e.g., —O—, —S—, —C(=O)—, and —N(R)—, wherein "R" denotes an alkyl group). Also, the molecular structure of a polymer composing a solid polymer electrolyte membrane is not particularly limited. The molecular structure may be either linear or branched, or may comprise a cyclic structure.

Furthermore, the types of acid group that a solid polymer electrolyte comprises are not particularly limited. Examples of such acid group include a sulfonic acid group, a carboxylic acid group, a phosphonic acid group, and a sulfonimide group. A solid polymer electrolyte may contain only 1 type or 2 or more types of these electrolyte groups. Moreover, these acid groups may be directly bound to a linear solid polymer compound or to either the main chain or the side chain of a branched solid polymer compound.

Specific examples of hydrocarbon-based electrolytes include:

(1) polyamide, polyacetal, polyethylene, polypropylene, acrylic resin, polyester, polysulphone, and polyether wherein an acid group such as a sulfonic acid group is introduced into any one of polymer chains, and derivatives thereof (aliphatic hydrocarbon-based electrolytes);

(2) polystyrene, polyamide having an aromatic ring, polyamideimide, polyimide, polyester, polysulphone, polyetherimide, polyether sulfon, and polycarbonate wherein an acid group such as a sulfonic acid group is introduced into any one of polymer chains, and derivatives thereof (partially aromatic hydrocarbon-based electrolytes); and (3) polyetheretherketone, polyetherketone, polysulphone, polyethersulphone, polyimide, polyetherimide, polyphenylene, polyphenylene ether, polycarbonate, polyamide, polyamideimide, polyester, and polyphenylene sulfide wherein an acid group such as a sulfonic acid group is introduced into any one of polymer chains, and derivatives thereof (fully aromatic hydrocarbon-based electrolytes).

Furthermore, specific examples of such partial fluorine-based electrolyte include polystyrene-grafted-ethylene tetrafluoroethylene copolymer (hereinafter, referred to as "PS-g-ETFE") and polystyrene-grafted-polytetrafluoroethylene wherein an acid group such as a sulfonic acid group is introduced into any one of polymer chains, and derivatives thereof.

Furthermore, specific examples of such wholly fluorinated electrolyte include Nafion (registered trademark) manufactured by Du Pont Co., Ltd., Aciplex (registered trademark) manufactured by Asahi Chemical Industry Co., Ltd., Flemion (registered trademark) manufactured by Asahi Glass Co., Ltd., and derivatives thereof.

Moreover, in the present invention, a solid polymer electrolyte membrane composing MEA may comprise a solid polymer electrolyte alone or may be a complex containing a reinforcing material comprised of a porous material, a long-fiber material, a short fiber material, and the like.

Among them, a fluorine-based electrolyte, in particular, a wholly fluorinated electrolyte has a C—F bond within a polymer chain and is excellent in oxidation resistance. Hence, a polymer electrolyte fuel cell excellent in oxidation resistance and durability can be obtained by applying the present invention thereto.

An electrode composing MEA has generally a double-layered structure with a catalyst layer and a diffusion layer, but may also be composed of a catalyst layer alone. When an electrode has a double-layered structure with a catalyst layer and a diffusion layer, the electrode is bonded to an electrolyte membrane via the catalyst layer.

A diffusion layer serves to carry out electron exchange with a catalyst layer and to supply a reaction gas to the catalyst layer. For a diffusion layer, generally carbon paper, carbon cloth, and the like are used. Also, a diffusion layer that may be used herein is prepared by coating the surface of carbon paper or the like with a mixture (repellent layer) of repellent polymer powder (e.g., polytetrafluoroethylene) and carbon powder in order to enhance repellency.

A catalyst layer provides a reaction field for an electrode reaction, generally comprising a powdered electrode catalyst or a powdered carrier onto which an electrode catalyst is loaded and an intra-catalyst-layer electrolyte covering the periphery.

Such infra-catalyst-layer electrolyte serves to carry out proton exchange between the solid polymer electrolyte membrane and the electrode. For such an intra-catalyst-layer electrolyte, generally, the same materials as those composing a solid polymer electrolyte membrane are used, but different materials may also be used herein. The optimum amount of the intra-catalyst-layer electrolyte is selected depending on the MEA applications, working conditions, and the like.

For the polymer electrolyte fuel cell according to the present invention, the electrode catalyst according to the present invention is used as a catalyst layer. This makes it different from conventional polymer electrolyte fuel cells. The electrode catalyst according to the present invention may be used for either anodes or cathodes, or for both thereof.

In the electrode catalyst according to the present invention, a composite of an intra-catalyst-layer electrolyte for attaining three-phase boundary and an electrode catalyst is formed by impregnating an electrode catalyst immobilized on the surface of a base with a solution prepared by dissolving the intra-catalyst-layer electrolyte solution and then volatilizing the solvent.

The composite of the intra-catalyst-layer electrolyte and the electrode catalyst substrate and the electrolyte membrane or the diffusion layer are stacked together and hot-pressed. The base is then removed, so that the electrode catalyst can be transferred to the electrolyte membrane or the diffusion layer.

In addition, when the above-described vertically aligned CNTs are used as a porous carbon film, a catalyst for CNT synthesis remains on the surface of a base after the transfer of an electrode catalyst. Hence, a catalyst for CNT synthesis will almost never adversely affect the catalyst layer of a fuel cell.

Next, the electrode catalyst substrate and the production method thereof according to the present invention, as well as the effects of a polymer electrolyte fuel cell, are as described below.

A powdered electrode catalyst wherein catalyst particles are loaded onto a carbon carrier is generally produced by;
(1) dispersing a powdered carbon carrier in an aqueous solution in which a catalyst metal source has been dissolved;
(2) removing moisture via volatilization and then causing the catalyst metal source to adsorb the carbon carrier surface; and
(3) carrying out hydrogen reduction for the carbon carrier onto which the catalyst metal source is loaded.

The surface of a carbon carrier is generally hydrophobic, so that it has low property of being moisturized with a polar solvent such as water. However, when a powdered carbon carrier is dispersed and agitated in a polar solvent, the surface of the carbon carrier and the polar solvent can be forced to be in contact with each other. Therefore, even when a catalyst metal source is dissolved in a polar solvent such as water and then used, catalyst particles can be relatively uniformly and finely loaded onto the surface of the carbon carrier. However, fragmentation and uniform dispersion of the catalyst particles thus obtained by such method are limited.

Also, the thus obtained powdered electrode catalyst is generally used in the form of a catalyst ink (paste for electrodes) in which the catalyst is dispersed in a solvent together with an intra-catalyst-layer electrolyte. The obtained catalyst ink is applied onto an appropriate substrate (e.g., polytetrafluoroethylene sheet) and then transferred via hot-pressing onto the surface of an electrolyte membrane so as to form a catalyst layer. However, uniform dispersion of the powdered electrode catalyst in such catalyst ink is generally difficult, by which electrode catalyst aggregation takes place. Hence, there are problems such as the low utilization rate of a catalyst metal and difficulties in realization of uniform catalyst layer thickness.

To address such problems, catalyst particles may be loaded onto the surface of a porous carbon film (including onto the inner surfaces of open pores) using a porous carbon film as a catalyst carrier. However, porous carbon film surfaces are also generally hydrophobic. Accordingly, if the surface of a porous carbon film is caused to come into contact with a polar solvent solution in which a catalyst metal source has been dissolved, the solution will not deeply penetrate the open pores. Therefore, catalyst particles are only loaded onto the uppermost surface of the porous carbon film, and thus a catalyst layer with high electrode reaction efficiency cannot be obtained.

In contrast, when a porous carbon film is hydrophilized, its property of being moisturized with the polar solvent is improved. Therefore, a catalyst metal source is dissolved in a polar solvent and then the solution is caused to come into contact with a hydrophilized porous carbon film, so that the open pores can be impregnated deeply with the polar solvent solution. As a result, catalyst particles can be loaded uniformly and entirely onto the porous carbon film.

Also, when a method that involves, after the hydrophilized porous carbon film and the polar solvent solution are caused to come into contact with each other, further adding a reducing agent to the solution, and then reducing the catalyst metal source in the solution (hereinafter, referred to as a "liquid-phase reduction method") is employed, compared with other methods (for example, a method that involves impregnating with a solution, removing a polar solvent by volatilization, and thus performing hydrogen reduction (hereinafter, referred to as a "vapor-phase reduction method")), fine catalyst particles can be loaded in a highly dispersed manner. In particular, when reduction is carried out under mild conditions in a solution using a reducing agent with relatively weak reduction power, fine catalyst particles can be loaded in a highly dispersed manner.

This may be because:
(1) a hydrophilic group introduced on the surface of a porous carbon film functions as a nucleus for precipitation of catalyst particles; and
(2) whereas in the case of the vapor-phase reduction method, a catalyst metal source tends to be aggregated when a polar solvent is volatalized, no removal of a polar solvent by volatilization is carried out in the liquid-phase reduction method, so that the catalyst metal source will never be aggregated on the surface of the porous carbon film.

EXAMPLES

Example 1

1. Preparation of Sample

A porous film of carbon nanotubes vertically aligned on an Si substrate (manufactured by Hitachi Zosen Corporation; carbon density: 0.2 mg/cm$^2$) was exposed to UV radiation in the air for 5 minutes. UV-42 (manufactured by Filgen, Inc.) was used for UV radiation.

A porous CNT film hydrophilized by UV treatment was immersed in a solution prepared by dissolving 11.8 mg of a dinitrodiammine Pt nitrate solution in 90 mL of water. Ethanol (76.5 mg) was added as a reducing agent to the solution, and then the solution was agitated for 1.5 hours. Subsequently, the temperature of the solution was increased to 90° C. to 95° C., followed by 8 hours of reflux. Then, 7.65 g of ethanol was additionally added and then the solution was further agitated for 2 hours.

After the solution was left to cool, the porous CNT film was removed from the solution and then washed with approximately 150 mL of water. Furthermore, the porous CNT film was dried naturally and then vacuum-dried overnight at 80° C.

2. Evaluation

Figure 1:
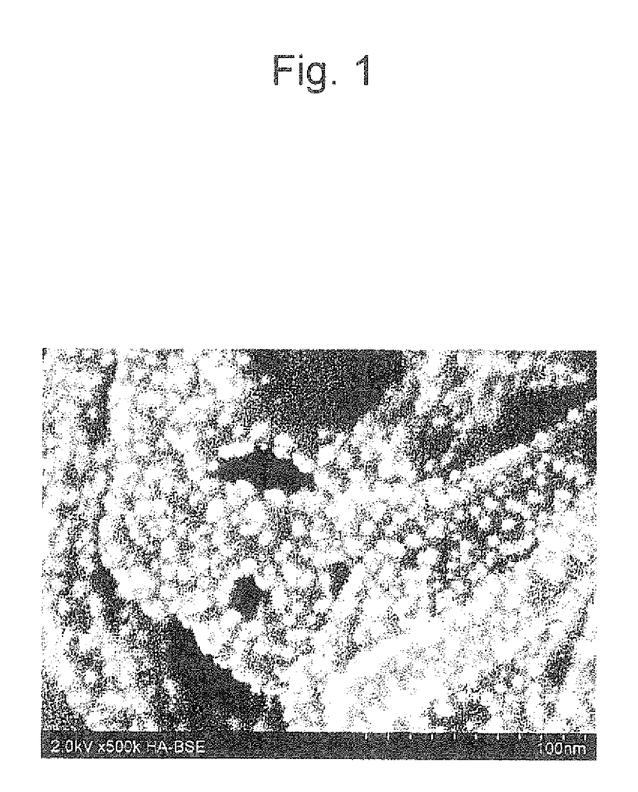
FIG. 1 shows a reflected electron image of the electrode catalyst obtained in Example 1.

FIG. 1 shows a reflected electron image of the electrode catalyst as obtained by SEM observation. The white masses in FIG. 1 are Pt particles. In Example 1, Pt particles were uniformly loaded entirely onto the porous vertically aligned CNT film.

Meanwhile, the mean particle diameter of Pt particles and the number (loading density per surface area of CNT) of Pt particles loaded onto the CNT surface were measured based on TEM images. As a result, the mean particle diameter of Pt particles was 1.5±1 nm and the loading density was 2.6×10$^{16}$ particles/m$^2$. Moreover, the Pt level was 0.2 mg/cm$^2$. The surface area of Pt particles, which provides a reaction field for a fuel cell, was determined from the particle diameter. The surface area of the Pt particles obtained in Example 1 was found to be approximately 1.3 times greater than that in the later-described Comparative example 1.

Comparative Example 1

1. Preparation of Sample

A dinitrodiammine Pt nitrate solution was diluted with ethanol. The diluted solution was repeatedly subjected to dropwise addition thereof onto an unhydrophilized porous vertically aligned CNT film (manufactured by Hitachi. Zosen Corporation; carbon density: 0.2 mg/cm$^2$), drying, and hydrogen reduction at 200° C., so that the Pt level was 0.2 mg/cm$^2$.

2. Evaluation

In the case of Comparative example 1, Pt particles were uniformly loaded entirely onto the porous vertically aligned CNT film according to observation, similarly to the case of Example 1.

Similarly, the mean particle diameter and loading density of Pt particles were measured based on TEM images. As a result, the mean particle diameter of Pt particles was 2±1 nm and the loading density of Pt particles was 1.1×10$^{16}$ particles/m$^2$.

Comparative Example 2

1. Preparation of Sample

Liquid phase reduction was carried out according to procedures similar to those in Example 1, except that no UV treatment was performed for the porous vertically aligned CNT film.

2. Evaluation

Figure 2A:
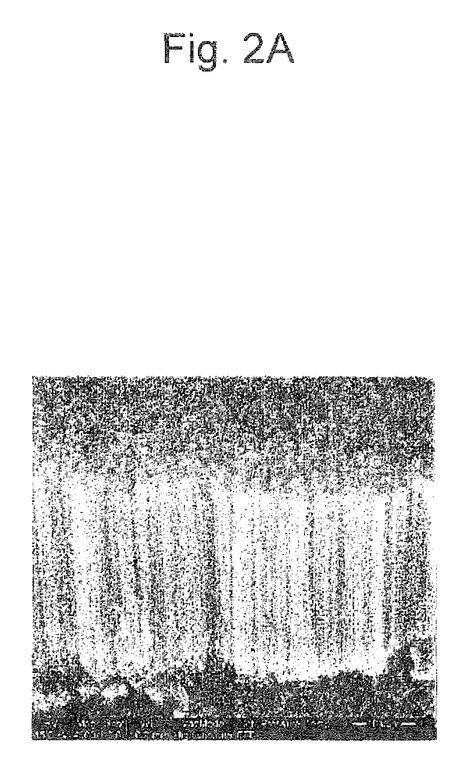
FIG. 2A shows a secondary electron image of the electrode catalyst obtained in Comparative example 2.
Figure 2B:
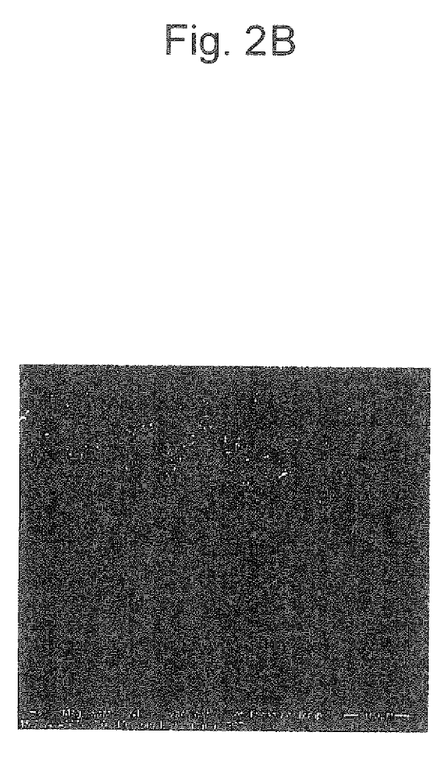
FIG. 2B shows a reflected electron image of the electrode catalyst obtained in Comparative example 2.

FIG. 2A and FIG. 2B show the secondary electron image (FIG. 2A) and the reflected electron image (FIG. 2B) of the obtained electrode catalysts, In FIG. 2B, the white masses are Pt particles. In the case of Comparative example 2, it was confirmed that the catalyst was ununiformly segregated in the vicinity of the uppermost surface of the porous vertically aligned CNT film. Moreover, the mean particle diameter of Pt particles was 200 nm±100 nm and the loading density of Pt particles was 2.0×10$^{10}$ particles or less.

Specific embodiments of the present invention are explained above. However, the present invention is not limited by the above embodiments, and certain changes and modifications may be made without departing from the scope of the invention.

INDUSTRIAL APPLICABILITY

The electrode catalyst substrate and the production method thereof according to the present invention can be used as an electrode catalyst for anodes and/or cathodes of various electrochemical devices such as fuel cells, solar cells, lithium cells, water electrolytic devices, electrolytic devices for halogen acid, electrolytic devices for common salt, oxygen and/or hydrogen thickners, humidity sensors, gas sensors, and photocatalysts, and as a production method thereof.

The invention claimed is:

1. A method for producing an electrode catalyst substrate, comprising:
    a carbon film forming step of forming a porous carbon film on a base;
    a hydrophilization step of hydrophilizing the porous carbon film;
    an immersion step of immersing the porous carbon film in a liquid solution prepared by dissolving catalytic metal ions in a polar solvent; and
    a reduction step of adding a liquid reducing agent to the liquid solution and then reducing the catalytic metal ions, wherein the temperature is increased while convecting the liquid solution in the coexistence of the liquid reducing agent.

2. The method for producing an electrode catalyst substrate according to claim 1, wherein the carbon film forming step comprises forming a porous film of carbon nanotubes vertically aligned on the base.

3. The method for producing an electrode catalyst substrate according to claim 1, wherein the hydrophilization step comprises hydrophilizing the porous carbon film by UV ozonation.

4. The method for producing an electrode catalyst substrate according to claim 1, wherein the polar solvent is a liquid polar solvent.

5. The method for producing an electrode catalyst substrate according to claim 4, wherein the liquid polar solvent is chosen from water, ethanol, methanol, 1-propanol, 2-propanol, butanol, ethylene glycol, and propylene glycol.

6. The method for producing an electrode catalyst substrate according to claim 1, wherein the liquid reducing agent is chosen from ethanol, methanol, ethylene glycol, and propylene glycol.

* * * * *